United States Patent Office 3,083,180
Patented Mar. 26, 1963

3,083,180
OXYGEN-CONTAINING HETEROCYCLEMETHYL DIHYDROQUINOLINYL ETHERS
Gerhard H. Alt, University City, Mo., and Gene R. Wilder, St. Albans, W. Va., assignors to Monsanto Chemical Company, St. Louis, Mo., a corporation of Delaware
No Drawing. Filed June 10, 1960, Ser. No. 35,113
11 Claims. (Cl. 260—45.8)

This invention relates to a new class of compounds and more particularly to oxygen-containing heterocyclemethyl dihydroquinolinyl ethers which may be represented by the formula Q—$CH_2$—O—T where Q represents an oxygen-containing heterocycle and T represents a dihydroquinolinyl radical, to a method of preservation of rubber and especially to rubber compositions resistant to exposure cracking.

Rubber deteriorates upon aging and it has long been known that its deterioration can be greatly retarded by treatment before or after vulcanization with substances known as age resistors or antioxidants. Surface cracking was soon recognized to be an independent phenomenon. It was initially assumed to result from action of ultra violet light but it is now known that ozone is one of the major causes. Because styrene-butadienecopolymer is more susceptible to surface cracking than natural rubber its widespread use has intensified the problem. Surface cracking accelerates greatly when the rubber is under strain. Unfortunately, efficient antioxidants are not necessarily effective for preventing exposure cracking.

Preventing exposure cracking requires presence of the inhibitor on the surface of the rubber. Indeed, waxed coatings are widely used and are effective if nothing disturbs or breaks the protective film during service. Similarly, chemical catalytic inhibition is believed to require continuous presence of inhibitor at the rubber surface. Ability to migrate through the rubber has been postulated to be required for preventing exposure cracking. This view has been supported by the observation that adjuvants which are known from experience to prevent exposure cracking migrate readily and are often quite volatile. Migration and volatility are not unmixed blessings, however, because they result in gradual loss of protection. An antidegradant of fugitive nature has only limited use. Moreover, the antidegradant may exert a detrimental effect on other articles and on adjacent parts of the same article.

An object of this invention is to provide compounds which inhibit both degradation caused by ozone and degradation due to heat, aging and oxidation. A further object is to provide new dihydroquinolines of reduced volatility and migration but of undiminished effectiveness as compared to dihydroquinolines heretofore used. A further object is to provide rubber articles both natural and synthetic, vulcanized and unvulcanized, which resist deteriorating influence of air, ozone, oxygen, heat, light, aging and flexing for extended periods. A still further object is to provide high molecular weight antidegradants which can be economically manufactured by existing procedures from readily available raw materials. Further objects will in part be apparent and in part pointed out in the detailed description following.

The antidegradants of the present invention may be more particularly represented by the general formula

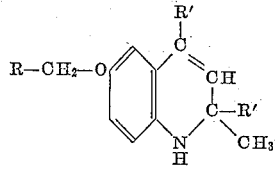

where R is a 5 or 6 member oxygen-containing heterocycle which may be saturated or unsaturated and R' represents lower alkyl. These compounds form by condensing the corresponding anilines with ketones, as for example acetone, methyl ethyl ketone, methyl isopropyl ketone and methyl isobutyl ketone. Condensation of 4-furfuryloxyaniline, 4-tetrahydrofurfuryloxyaniline and 4-(tetrahydropyran-2-methoxy)aniline with acetone in the presence of a suitable catalyst yields 1,2-dihydro-6-furfuryloxy-2,2,4-trimethylquinoline, 1,2-dihydro-6-tetrahydrofurfuryloxy-2,2-4-trimethylquinoline and 1,2-dihydro-6-(tetrahydropyran-2-methoxy)-2,2,4-trimethylquinoline respectively. Suitable catalysts are iodine, benzenesulfonic acid, toluenesulfonic acid and other dehydration catalysts. The minor proportion of by-products which form need not be separated and may even contribute antidegradant properties. Where pure products are desired, they may be obtained by fractional distillation of composite reaction mixture.

One method successfully used for preparation of the intermediates involved preliminary preparation of the tosylates. For example, 102 grams of tetrahydrofurfuryl alcohol and 200 grams of pyridine were charged to a reactor and 200 grams of toluene sulfonyl chloride added dropwise to the reaction mixture while keeping the temperature below 40° C. The reaction mixture was then pouring into water and neutralized with sodium bicarbonate. The product was dissolved in benzene and the benzene solution dried over sodium sulfate. The benzene was removed leaving as a residue 221 grams of tetrahydrofurfuryl tosylate. The tosylate was added gradually over a period of 30 minutes to a mixture of 120 grams of p-nitrophenol, 57 grams of potassium hydroxide and 300 grams of dimethylformamide. The reaction mixture was kept at 90–100° C. during the addition. The temperature was then raised to 120° C. for 30 minutes after which the reaction mixture was poured into 500 ml. of 10% sodium hydroxide along with 200 ml. of benzene. The benzene extract was washed with dilute aqueous sodium hydroxide solution, with water, with dilute hydrochloric acid and with water again, then dried over sodium sulfate. After filtering from sodium sulfate and removing the benzene by distillation, the residue was distilled under reduced pressure to obtain 4-tetrahydrofurfuryloxy-nitrobenzene which boiled at 192–195° C. under 5 mm. pressure, M.P. 51–52° C. 4-furfuryloxynitrobenzene is a crystalline solid M.P. 98.5–99° C. Both compounds are readily converted to the corresponding anilines by catalytic reduction over platinum. 4-tetrahydrofurfuryloxy aniline boiled at 216–220° C. at 25 mm. pressure.

Into a 500 ml. reactor fitted with stirrer, condenser, water trap and inlet line was charged 100 grams (0.518 mole) of the above-described 4-tetrahydrofurfuryloxy aniline and 4.9 grams of toluene sulfonic acid. The reaction mixture was heated to 130° C. and acetone at the rate of about 3.7 ml. per minute gradually fed to the reaction mixture as a vapor. Over a period of about 5 hours, 27.5 ml. of water were collected. The resulting product was then heated under reduced pressure to remove low boiling constituents. After stripping at 125–132° C. for 20 minutes under the reduced pressure obtained by a water aspirator, the residue comprised 144 grams of a dark amber viscous liquid which was an efficient antidegradant. A pure sample of 1,2-dihydro-6-tetrahydrofurfuryloxy - 2,2,4 - trimethylquinoline was isolated by distillation. The fraction distilling at 194–200° C. under 2 mm. pressure was collected. It contained 5.4% nitrogen as compared to 5.1% nitrogen calculated for $C_{17}H_{23}NO_2$.

As a specific embodiment of the invention illustrating the antidegradant properties, a rubber base composition was compounded comprising:

| | Base stock A, parts by weight |
|---|---|
| Smoked sheets rubber | 100 |
| Carbon black | 50 |
| Zinc oxide | 5 |
| Stearic acid | 3 |
| Sulfur | 2.5 |
| Saturated hydrocarbon softener | 3 |
| N-cyclohexyl-2-benzothiazolesulfenamide | 0.5 |

To the base composition was added 1.5 parts by weight of antidegradant and the composition cured by heating 45 minutes at 144° C. The stocks were then aged under various conditions and the proportion of the original tensile strength retained after aging observed. In the results recorded below, test tube aging refers to results obtained by the test tube method, A.S.T.M. designation D–865–57, A.S.T.M. Standards, 1958, p. 1453.

*Table I*

| | Percent Retention of Ultimate Tensile Strength | | | |
|---|---|---|---|---|
| Antidegradant | Test Tube Aging | | Air Bomb Aging—4 hrs./121° C. Under 80# air pressure/in.² | Oxygen Bomb Aging—5 days/70° C. under 300# oxygen/in.² |
| | 48 Hrs. at 100° C. | 72 Hrs. at 100° C. | | |
| None | 16 | 13 | 21 | Embrittled. |
| 1,2-Dihydro-6-tetra-hydro-furfuryloxy-2,2,4-trimethyl-quinoline. | 40 | 30 | 36 | 46. |

These data demonstrate that the new antidegradants prevents deterioration by air or oxygen.

To demonstrate anti-exposure cracking properties, tests were conducted in the above-described natural rubber base stock A and rubber base stocks comprising:

| | Base Stock B | Base Stock C |
|---|---|---|
| | Parts by weight | |
| Pale crepe rubber | 100 | |
| SBR 1500 Rubber | | 100 |
| Carbon black | | 50 |
| Titanium dioxide | 50 | |
| Zinc oxide | 25 | 4 |
| Clay | 15 | |
| Stearic acid | 1 | 2 |
| Sulfur | 3 | 1.75 |
| 2,2'-Dithiobis benzothiazole | 0.6 | |
| Diphenyl guanidine | 0.15 | |
| Saturated hydrocarbon softener | | 10 |
| N-Cyclohexyl-2-benzothiazolesulfenamide | | 1 |

SBR 1500 is styrene-butadiene copolymer rubber, the bound styrene content of which is 23.5%. Antioxidant is added but this has no significant effect in preventing exposure cracking. The stocks compounded from base stock B were cured by heating in a press 45 minutes at 144° C. and those from base stock C by heating in a press for 60 minutes at 144° C. Since evaluation under static conditions is not indicative of the service obtained with many types of rubber articles which must withstand flexing, the vulcanized compositions were evaluated under dynamic conditions in an atmosphere containing a definite concentration of ozone. The test was carried out in the following manner: Samples of the stocks were cured in the form of a belt ½ inch wide, ¼ inch thick and 5⁵⁄₁₆ inches inside diameter and mounted on 1 inch diameter shafts. The ozone concentration was maintained at 20–30 parts per hundred million throughout the test and the shafts rotated at 75 r.p.m. In this manner a momentary elongation through a range of 0–20% was provided at any portion of the test specimens passing over the shaft. Further details of the apparatus and procedure employed were described by Creed et al., in Analytical Chemistry, vol. 25, page 241, February 1953. The test specimens were compared visually to previously selected standards at regular intervals, noting the extent of cracking. The standards represented different degrees of cracking on a numerical scale of 1–6 on which 1 meant no cracking and 6 extremely severe cracking. Severity of cracking was assigned numerical rating in this manner. Curves obtained by plotting the severity of cracking on the Y axis in inverse order versus time of exposure on the X axis, provide a convenient representation of the relationship between severity of cracking and time. Comparative results were obtained by determining and comparing the areas under the curves. The results were expressed on the basis of the blank or unprotected stock as 100. Thus, a value of 200 means that the area under the above-described curve was twice that for the unprotected stock.

*Table II*

| | | Protection Rating Against Ozone | | |
|---|---|---|---|---|
| Antidegradant | Amount, Parts by weight | Natural Rubber | | Styrene-Butadiene Copolymer Rubber, Base C |
| | | Base A | Base B | |
| None | | 100 | 100 | 100 |
| 1,2 - Dihydro - 6 - tetrahydro-furfuryloxy - 2,2,4 - trimethyl-quinoline | 1.5 | 193 | 228 | 129 |

Stress relaxation measurements afforded another important demonstration of antidegradant properties. A weight was affixed to one end of a cured strip of rubber, the other end of which was maintained in fixed position. Gradual relaxation of stress was followed by periodically measuring the elongation. The time for elongation to increase 100% was recorded. This test, commonly referred to as creep test, furnishes a reliable indication of fugitiveness of an antidegradant. The applied loads were 60 pounds per square inch and 45 pounds per square inch respectively to base stocks A and B. In each case the amount of antidegradant was 1.5 parts by weight. As a control, a commercial antidegradant 1,2-dihydro-6-ethoxy-2,2,4-trimethylquinoline was used.

*Table III*

| | Creep—Hours to 100% increase in elongation | |
|---|---|---|
| Antidegradant | Base A | Base B |
| None | 24 | 22 |
| 1,2 - Dihydro - 6 - ethoxy - 2,2,4 - trimethyl - quinoline | 30 | 39 |
| 1,2 - Dihydro - 6 - tetrahydrofurfuryloxy - 2,2,4-trimethylquinoline | 32 | 45 |

The new antidegradants were added to styrene-butadiene copolymer rubber (SBR 1500, 23.5% bound styrene, 19.9 solids but from which antioxidant had been omitted) employing 1.2% of the rubber hydrocarbon. The test materials were incorporated into the rubber by milling at 50° C. Samples of the products were then aged in a circulating air oven at 100° C. for the indicated times. The viscosity of the specimens was determined before and after aging by a Mooney plastometer (Melvin Mooney, Industrial and Engineering Chemistry, Analytical Edition, March 14, 1934, pages 147–151) following A.S.T.M. Method D–927. The viscosity of the unstabilized copolymer increases rapidly upon aging whereas the stabilized product forms no resinous skin and retains a viscosity close to that of the unaged specimens. The differences between viscosities before and after aging are a measure of the stabilizing action, little or no increase indicating high activity. Phenyl-beta-naphthylamine, widely used commercially for stabilizing SBR rubber, was employed as a control. The results follow:

Table IV

| Antidegradant | Mooney Viscosity After Aging | | | |
|---|---|---|---|---|
| | 0 Hrs. | 8 Hrs. | 24 Hrs. | 48 Hrs. |
| None | 49 | | 151 | 178 |
| Phenyl-beta-naphthylamine | 44 | 43 | 45 | 53 |
| 1,2 - Dihydro - 6 - tetrahydro - furfuryloxy - 2,2,4 - trimethylquinoline | 45 | 34 | 42 | 56 |

The new dihydroquinolines may be used for the protection of different kinds of rubber than those particularly mentioned above. They may be employed for the protection of natural rubber in its various forms, as for example latex, crepe, smoked sheets, gutta-percha, balata and cyclo rubbers. They are applicable generally for protection of natural and synthetic elastomers which deteriorate by absorbing oxygen and ozone from the atmosphere, as for example polybutadiene, polyisoprene and polyisobutylene polymerized with a small proportion of a diolefin. They are useful for protecting unvulcanized as well as vulcanized rubber. As illustrated, the antidegradants may be added with advantage to styrene-butadiene rubber at the time of manufacture. The protection then persists throughout storage, compounding, curing and service of the rubber article. While the invention has been illustrated by examples of the general formula Q—CH₂—O—T where Q—CH₂ represents tetrahydropyran-2-methyl, furfuryl or tetrahydrofurfuryl, it will be appreciated that other 5 and 6 member oxygen-containing heterocycles, whether saturated or unsaturated, can be substituted.

The amounts used in the rubber will vary depending upon the particular stock and purpose of the compounder. In general, amounts within the range of 0.1–5 parts encompass the range normally used. In case of massed rubber the antidegradant will ordinarily be incorporated by milling or similar mixing and masticating procedure but applying to the surface of rubber is also effective.

It is intended to cover all changes and modifications of the examples of the invention herein chosen for purposes of disclosure which do not constitute departures from the spirit and scope of the invention.

What is claimed is:

1. A compound of the structure

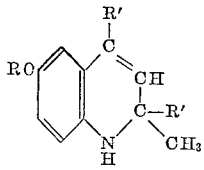

where R is selected from the group consisting of tetrahydropyran-2-methyl, furfuryl and tetrahydrofurfuryl and R' represents lower alkyl.

2. 1,2 - dihydro - 6 - tetrahydrofurfuryloxy-2,2,4-trimethylquinoline.

3. 1,2 - dihydro - 6-furfuryloxy-2,2,4-trimethylquinoline.

4. 1,2 - dihydro-6-(tetrahydropyran-2-methoxy)-2,2,4-trimethylquinoline.

5. A sulfur vulcanizable rubber composition containing a small amount sufficient to inhibit oxidative degradation and atmospheric cracking by ozone of a compound of the structure

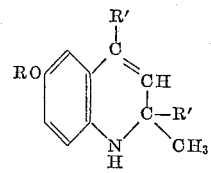

where R is selected from the group consisting of tetrahydropyran-2-methyl, furfuryl and tetrahydrofurfuryl and R' represents lower alkyl.

6. A sulfur vulcanizable rubber composition containing a small amount sufficient to inhibit oxidative degradation and atmospheric cracking by ozone of 1,2-dihydro-6-tetrahydrofurfuryloxy-2,2,4-trimethylquinoline.

7. A sulfur vulcanizable rubber composition containing a small amount sufficient to inhibit oxidative degradation and atmospheric cracking by ozone of 1,2-dihydro-6-furfuryloxy-2,2,4-trimethylquinoline.

8. A sulfur vulcanizable rubber composition containing a small amount sufficient to inhibit oxidative degradation and atmospheric cracking by ozone of 1,2-dihydro-6-(tetrahydropyran-2-methoxy)-2,2,4-trimethylquinoline.

9. Styrene-butadiene rubber containing a small amount sufficient to inhibit oxidative degradation and atmospheric cracking by ozone of a compound of the structure

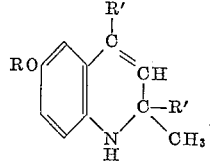

where R is selected from the group consisting of tetrahydropyran-2-methyl, furfuryl and tetrahydrofurfuryl and R' represents lower alkyl.

10. Vulcanized styrene-butadiene rubber containing a small amount sufficient to inhibit oxidative degradation and atmospheric cracking by ozone of the structure

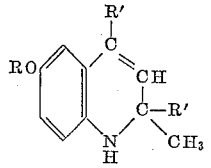

where R is selected from the group consisting of tetrahydropyran-2-methyl, furfuryl and tetrahydrofurfuryl and R' represents lower alkyl.

11. Natural rubber containing a small amount sufficient to inhibit oxidative degradation and atmospheric cracking by ozone of a compound of the structure

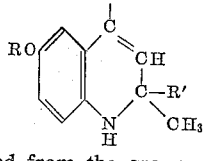

where R is selected from the group consisting of tetrahydropyran-2-methyl, furfuryl and tetrahydrofurfuryl and R' represents lower alkyl.

References Cited in the file of this patent

UNITED STATES PATENTS

| 2,783,234 | Campbell | Feb. 26, 1957 |
| 2,832,749 | Harris | Apr. 29, 1958 |
| 2,895,956 | Tuppy | July 21, 1959 |
| 2,941,949 | Pohle et al. | June 21, 1960 |